United States Patent
Aoki et al.

(10) Patent No.: US 8,156,442 B2
(45) Date of Patent: Apr. 10, 2012

(54) LIFE RECORDER AND SHARING

(75) Inventors: Kazuto Aoki, Tokyo (JP); Michael Line, Kawasaki (JP); Petri Heinonen, Tokyo (JP); Petteri Kettunen, Oulu (FI); Eriko Wanibe, Tokyo (JP)

(73) Assignee: Nokia Corporation (FI)

( * ) Notice: Subject to any disclaimer, the term of this patent is extended or adjusted under 35 U.S.C. 154(b) by 863 days.

(21) Appl. No.: 12/164,895

(22) Filed: Jun. 30, 2008

(65) Prior Publication Data
US 2009/0327885 A1 Dec. 31, 2009

(51) Int. Cl.
*G06F 3/00* (2006.01)

(52) U.S. Cl. ........ 715/753; 715/864; 715/733; 705/319; 709/204; 345/169

(58) Field of Classification Search ............ 715/733, 715/716, 719, 753, 764, 765, 963, 205, 700, 715/864; 709/201, 204, 217–219; 345/169, 345/172; 705/319
See application file for complete search history.

(56) References Cited

U.S. PATENT DOCUMENTS

| | | | |
|---|---|---|---|
| 7,639,943 B1 * | 12/2009 | Kalajan | 396/429 |
| 7,734,724 B2 * | 6/2010 | Rezvani et al. | 709/219 |
| 2001/0037509 A1 | 11/2001 | Kligman | |
| 2003/0041329 A1 | 2/2003 | Bassett | |
| 2003/0146977 A1 * | 8/2003 | Vale et al. | 348/207.1 |
| 2005/0078195 A1 | 4/2005 | Vanwagner | |
| 2007/0064124 A1 * | 3/2007 | Kirani et al. | 348/234 |
| 2007/0162487 A1 * | 7/2007 | Frailey | 707/102 |
| 2007/0276862 A1 * | 11/2007 | Toutonghi | 707/103 X |
| 2008/0030797 A1 * | 2/2008 | Circlaeys et al. | 358/448 |
| 2008/0106597 A1 | 5/2008 | Amini et al. | |
| 2009/0089352 A1 * | 4/2009 | Davis et al. | 709/201 |
| 2009/0172129 A1 * | 7/2009 | Singh et al. | 709/217 |
| 2009/0204885 A1 * | 8/2009 | Ellsworth et al. | 715/234 |
| 2009/0244278 A1 * | 10/2009 | Taneja et al. | 348/143 |
| 2009/0300109 A1 * | 12/2009 | Porter | 709/203 |
| 2010/0223314 A1 * | 9/2010 | Gadel et al. | 709/200 |

FOREIGN PATENT DOCUMENTS

| | | |
|---|---|---|
| EP | 1804455 A1 | 7/2007 |
| WO | 2007 149186 A2 | 12/2007 |

OTHER PUBLICATIONS

International Search Report Dated Oct. 1, 2009.

* cited by examiner

*Primary Examiner* — Xiomar L Bautista
(74) *Attorney, Agent, or Firm* — Alston & Bird LLP

(57) ABSTRACT

A system and method that includes capturing content active in a device, identifying at least one target device to which the captured content is to be uploaded, and automatically uploading the content to the at least one other target device if a content sharing module in the device is active.

20 Claims, 16 Drawing Sheets

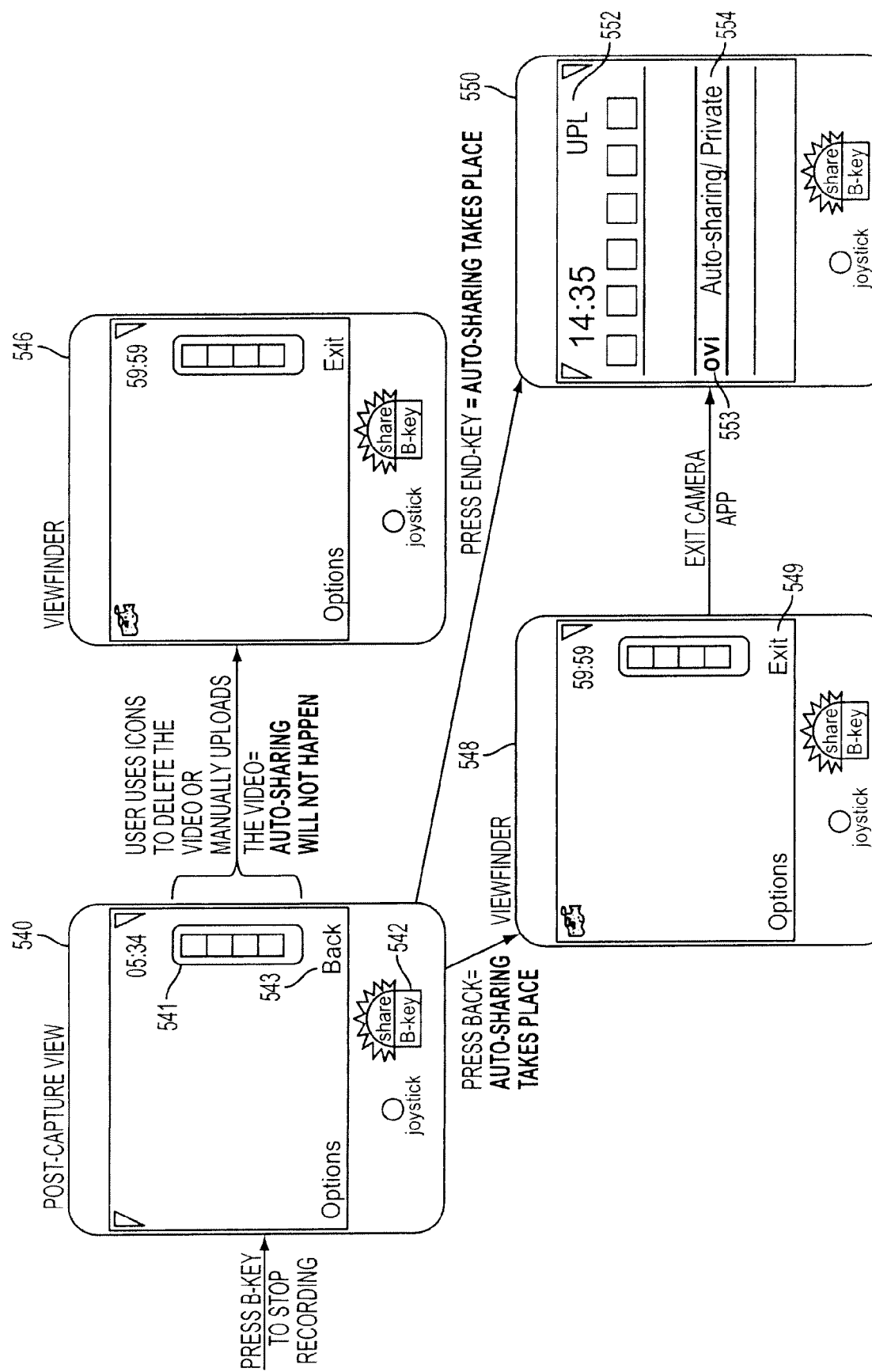

LIFE RECORDER AND SHARING

BACKGROUND

1. Field

The aspects of the disclosed embodiments generally relate to user interfaces and more particularly to a user interface for capturing and sharing content.

2. Brief Description of Related Developments

Social networking is becoming more commonplace. It can be desirable to be able to communicate and share information and data with your social group using mobile communication devices, for example. Services such as Facebook™ provide online directories and allow users to connect to people around them. Information and content can be made available to be viewed or shared with others. These services generally require users to manually update their profiles and then allow or provide other users access to resources or content they wish to share. For example, a user can update a personal profile that others can view, provide users with access to content such as pictures and videos, post messages for users to see or provide links to other content. However, these services require manual action on the part of the user to maintain and update the resources that provide information about the user. It would be advantageous to be able to automatically be able to provide real-time and/or live sharing of content and resources amongst members of a social network.

SUMMARY

The aspects of the disclosed embodiments are directed to a method. In one embodiment the method includes capturing content active in a device, identifying at least one target device to which the captured content is to be uploaded, and automatically uploading the content to the at least one other target device if a content sharing module in the device is active.

BRIEF DESCRIPTION OF THE DRAWINGS

The foregoing aspects and other features of the embodiments are explained in the following description, taken in connection with the accompanying drawings, wherein:

FIGS. 5A-5D are states of a user interface incorporating aspects of the disclosed embodiments;

DETAILED DESCRIPTION OF THE EMBODIMENT(s)

Figure 1:
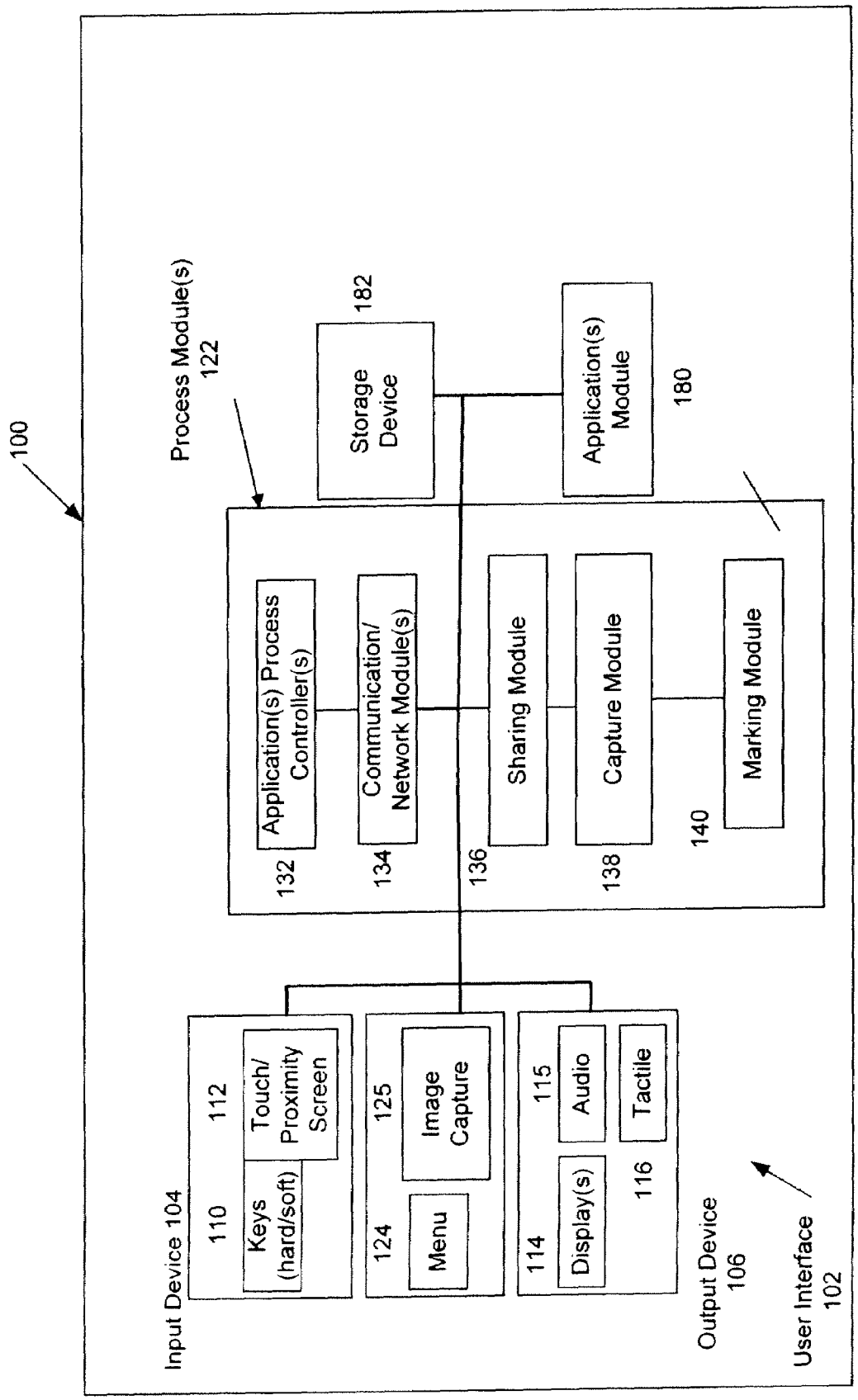
FIG. 1 shows a block diagram of a system in which aspects of the disclosed embodiments may be applied.

FIG. 1 illustrates one embodiment of a system 100 in which aspects of the disclosed embodiments can be applied. Although the disclosed embodiments will be described with reference to the embodiments shown in the drawings and described below, it should be understood that these could be embodied in many alternate forms. In addition, any suitable size, shape or type of elements or materials could be used.

The aspects of the disclosed embodiments generally provide for the automation of the recording, storing and uploading of content to one or more targets or contacts from a device, such as for example, a mobile communication device. A user can capture content with a device and share this captured content, live and in real-time, with members of the user's social network, for example. Using the aspects of the disclosed embodiments, a user can keep members of a social, business or other group up-to-date with the user's activities. These activities can include for example, a current status, a current location, and/or content the user has currently accessed, has recently accessed or desires to share. In alternate embodiments, any suitable information or data that can be accessed and shared in a real-time manner can be included.

The term "social" or "business" networking group is generally intended to include any person(s), entity(s) or other contact designated by a user as one with whom a user desires to be connected and with which information and content is desired to be shared. A group can include one or more entities or contacts. Members of a group can be designated in any suitable manner.

In one embodiment, the system 100 shown in FIG. 1 can comprise a communications device, such as a mobile communications device. The system 100 can include a content sharing module 136, content capturing module 138 and a content marking module 140. In one embodiment, the sharing module 136 is configured to enable the real-time sharing of content that is active or open on the system 100. The activation of the sharing module 136 will automatically cause content that is open and/or active on the system 100 to be captured and designated as content to be shared. In one embodiment, the sharing module 136 is activated using an input key or device of the system 100.

The capture module 138 is configured to receive instructions and commands from the sharing module 136 and capture the content that is currently active and/or open on the system 100. Capturing the content can include temporarily storing the content and/or links to the content for upload and transfer.

The marking module 140 is configured to mark or identify content that is stored or captured by the system 100 as content that is available or enabled to be shared. In one embodiment, the marking module 140 can automatically mark content that is open and/or active on the system 100 as content that is available to be shared. The marking module 140 can also be configured to receive user inputs to manually identify and mark content that is available to be shared. In one embodiment, the content is content that is currently open and/or active on the system. The content can also include content that is otherwise saved or stored on the system, and marked for sharing. For example, a user may mark content for sharing, but defer the upload of the content until a next activation of the sharing module 136. In alternate embodiments the system 100 can include other suitable devices and/or modules that allow for content to be captured by the device and shared in real-time with other users.

The aspects of the disclosed embodiments can also allow for multi-element capturing. This can include the simultaneous capturing of different content that is open and active on the device 100. The activation of the sharing module 136 can cause more than one content item to be automatically shared, when more than one content item is open and active on a device or otherwise marked for sharing. In one embodiment, the elements or content can include, for example, an image(s), video, location, uniform resource locator ("URL"), audio, weather, mood indicators, ambient light, ambient temperature, acceleration, speed, air pressure or music. In alternate embodiments, the elements can include any suitable information, object, or data. In one embodiment, the content to be captured is content that is open and active in the device. For example, the device 100 might be accessing a music website and at the same time reviewing a document or taking a picture. If the user desires to share the music website and picture, the activation of the share module 136 can cause each of this content to be automatically shared with the desired target contacts or group members. Similarly, if the device 100 is capable of location determination, the sharing could include not only the music website and picture, but also information related to the user's location (e.g. the location of the device 100.) Location information can be helpful for obtaining or providing status information.

Figure 2A:
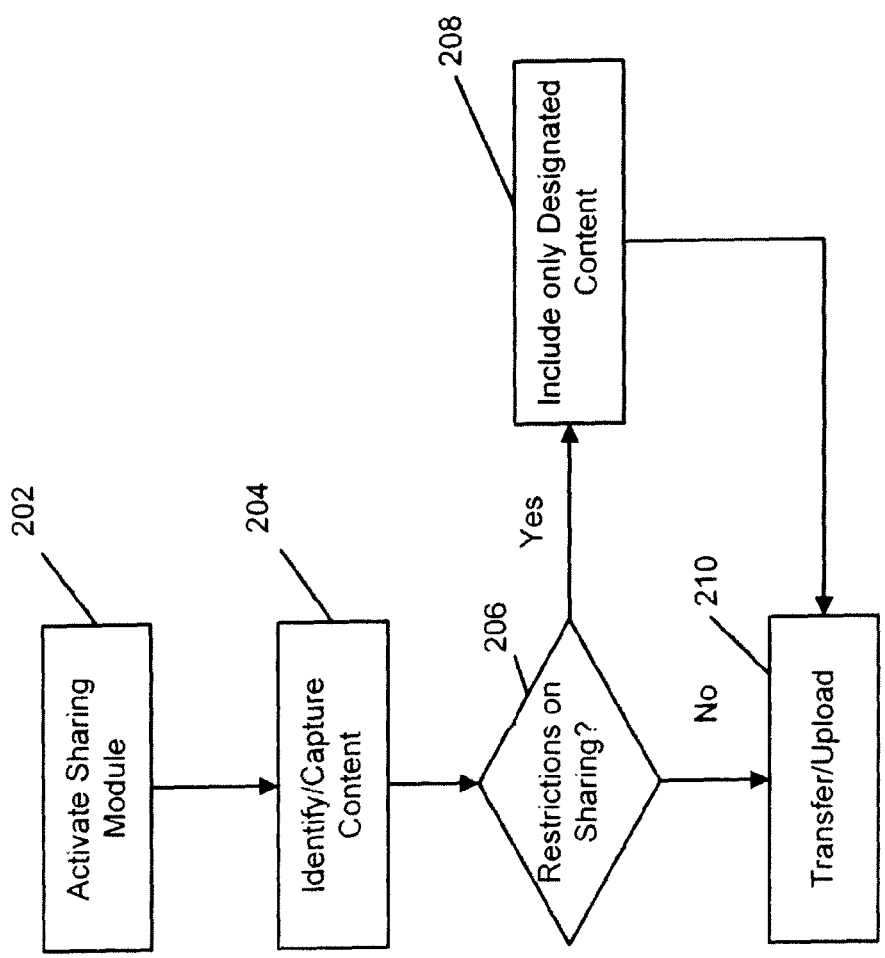
FIGS. 2A, 2B and 2C illustrate examples of a exemplary processes incorporating aspects of the disclosed embodiments.

Referring to FIG. 2A, an exemplary process flow incorporating aspects of the disclosed embodiments is illustrated. As shown in FIG. 2A, the user activates a content sharing facility 202. In one embodiment, this comprises activating an input key or button that is designated or includes the share functionality as described herein. Content that is open and active on the device is identified and captured 204. In one embodiment, a check 206 can be made to determine if all content that is identified 204 is eligible for sharing. For example, a user may wish to include or designate certain content as eligible to be shared. This could be done in a settings menu or designated and/or stored in the marking module 140. If all designated content is eligible for transfer and sharing, the captured content is automatically and substantially immediately uploaded 210 for sharing with other users. If all of the identified content is not eligible to be shared, only the content designated to be shared is marked 208 and shared 210.

Figure 2B:
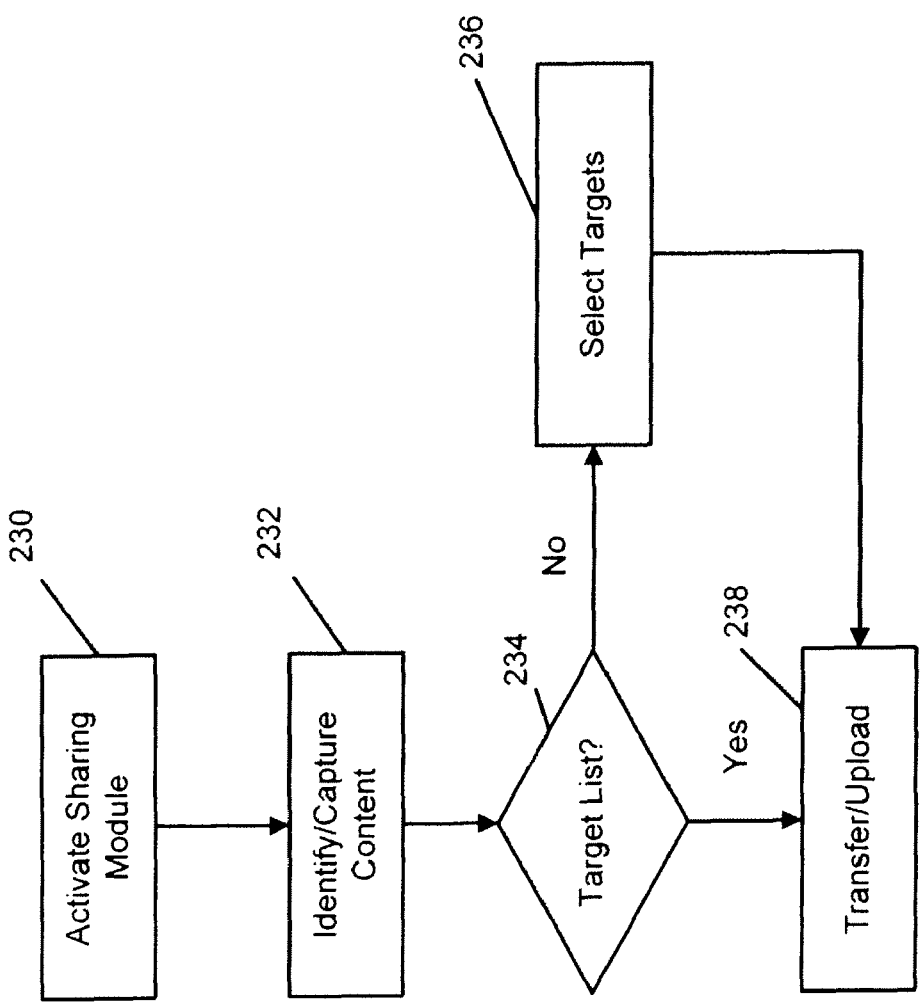

In one embodiment, the user(s) or other targets with whom content is to be shared can be pre-designated or manually selection from a list. For example, referring to FIG. 2B, in one embodiment, the user activates 230 the sharing module 136 of FIG. 1 while at least one content item is open and active. The content to be shared is captured 232 as is disclosed herein. It is determined 234 whether a pre-set list of contact(s) with whom to automatically share content is identified. In one embodiment, this can be called a share list. Different share lists can be assembled for different types of content. The system 100 can determine the type of content that has been captured and then determine is a specific share list has been designated for the specific type(s) of content.

If a share list exists, the content is automatically shared with the designated contact(s). If a share list or other pre-set list of contact(s) is not identified, target(s) or recipient(s) for the content to be shared can manually be selected. In one embodiment, this can comprise selecting a contact(s) from an address book application in a suitable manner.

Figure 2C:
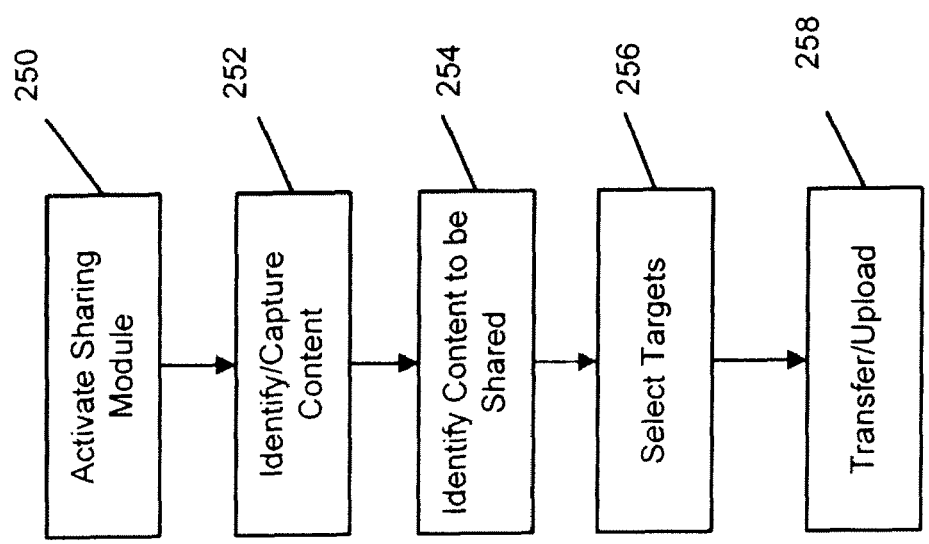

The aspects of the disclosed embodiments allow a user to designate what types of content can be shared as well as specific users or groups of users with which to share content. The various options and selections can be presented to the user in rolling fashion when the sharing module 136 is activated. For example, in one embodiment, referring to FIG. 2C, the user activates 250 the sharing module 136. The content that is open and/or active is captured 252. In one embodiment, the user can be presented with a list that identifies the captured content. From this list, the user can select or identify 254 content to be shared, or alternatively, content that is not to be shared. If the user has previously created a content share list that is stored in the device, for example in the marking module 140, the selection of content to be shared can be an automatic process. In one embodiment, the user might be presented a final list of the content to be shared before the content is transferred. From this final list, the user can have the option to accept or modify the choices before the content is transferred.

Once the user has identified the content to be shared, in one embodiment, the user can designate 256 the contact or contacts with whom the captured and designated content is to be shared. In one embodiment, the user can pre-set the contact or contact(s) with whom to share content automatically when the share facility 136 is activated. The user does not have to check or designate recipients for each share action. The list of contacts with whom to share can be stored, and the sharing process executed automatically.

In one embodiment, once the content to be shared is identified, the user can be asked to identify the recipient(s) of the content. This can include for example, selecting contact(s) from an address book list or inserting specific names or addresses. Addresses can include for example, email addresses, cellular numbers or networking website information (URL). In alternate embodiments any suitable method for designating contacts can be used. Once the contacts are identified the content can be shared 258.

In one embodiment, the sharing of content generally comprises uploading content in real-time to the user's social, business or other networking site. In one embodiment, a link can be provided that will allow other to access the uploaded content. The content sharing can be mediated by a third service, for example. This can provide the advantage of not having to wait for the user to manually access the networking site and update the information therein. The site, or sites, are automatically and substantially immediately updated with current and relevant data and information. Although only one networking site is generally referred to herein, the aspects of the disclosed embodiments will allow more than one networking site to be updated at substantially the same time. For example, a user may belong to more than one networking or social service. Each such site can be updated, in substantially real-time, with the captured information. The aspects of the disclosed embodiments will allow the system to store and utilize any required log-in information. For example, in one embodiment, the sharing module 136 of FIG. 1 can include a resource for storing the relevant networking site information, such as a link, as well as any log-in and/or authentication data. When the site is accessed, the sharing module 136 is configured to exercise any required log-in protocol, including any security and authentication protocols and exchanges, and provide seamless access and entry to the site and its resources in order to update information and upload content.

By being able to upload and update content in real-time, the updates can be much richer than just a current status indication. The aspects of the disclosed embodiments enable a user or subscriber to update other members in real-time with content related to what you are looking at (e.g. a photo, video, object) or where you are (location). This real-time status can be indicated on the respective service provider site.

Figure 3A:
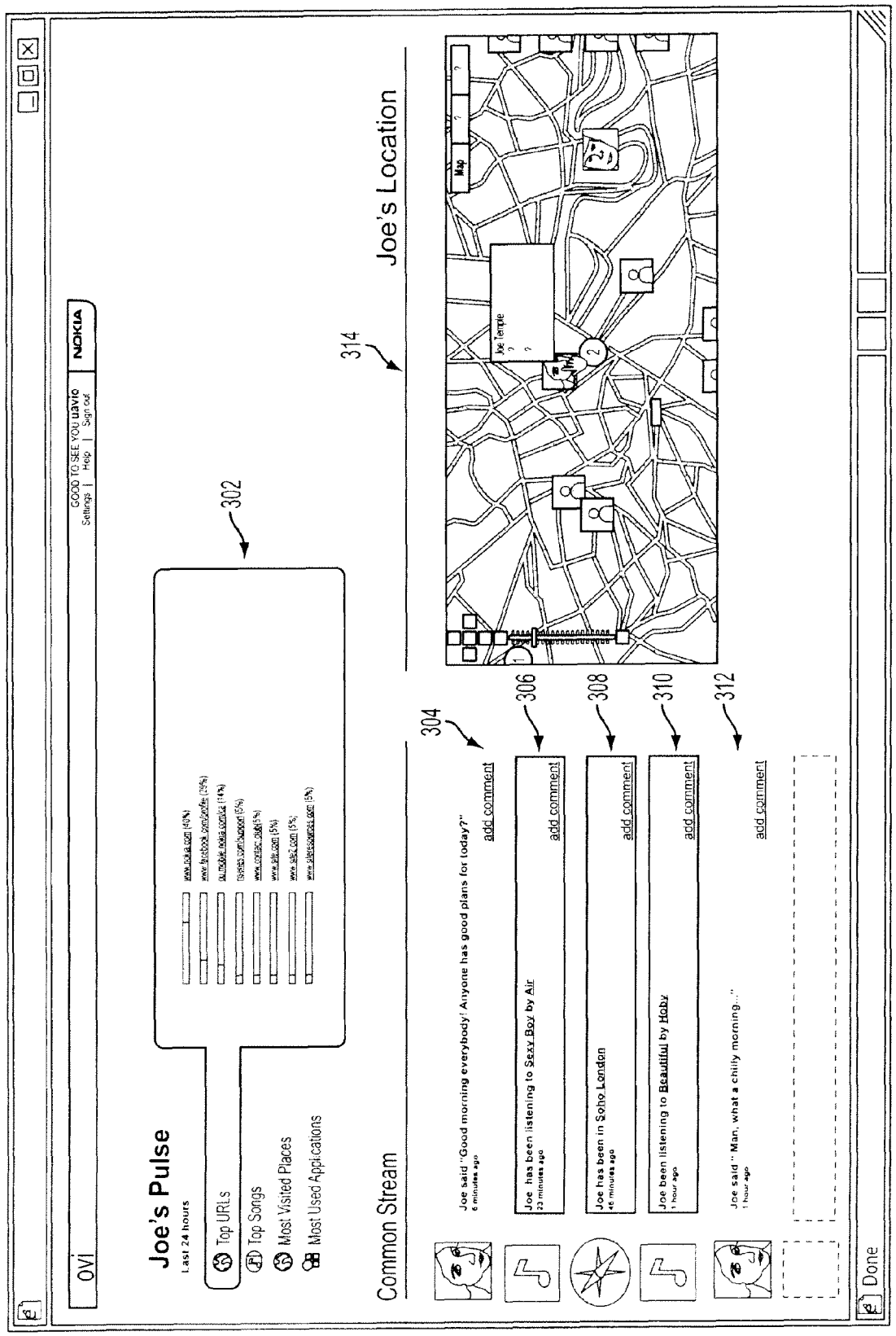
FIGS. 3A-3C illustrate exemplary user interfaces incorporating aspects of the disclosed embodiments.
Figure 3B:
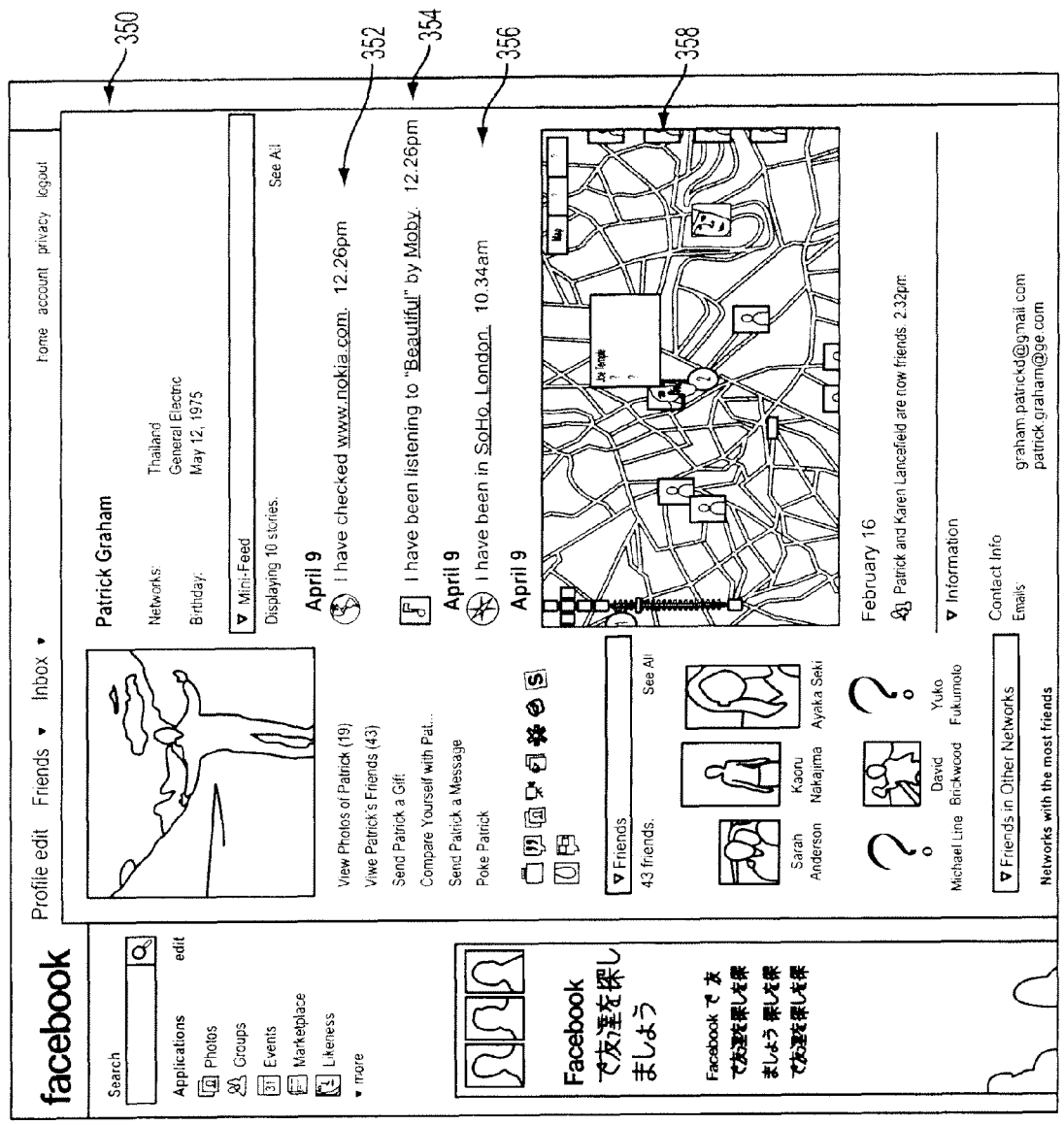

For example, referring to FIG. 3A, a screen shot 300 of a user's activity web page is illustrated. In this example, different categories of content, information and activities related to the user are shown. Section 302 identifies URL's visited by this user. Other content shown includes messages 304 and 312, music 306 and 310 as well as a visited location 308. The information can also include a time stamp as a reference. This user's location 314 is also illustrated. In one embodiment, the user can share any or all of this content and related information with another user or users. Referring to FIG. 3B, in accordance with the aspects of disclosed embodiments, the user of FIG. 3A, "Joe" has shared content and information with "Patrick". FIG. 3B is a screen shot 350 of "Patrick's" web page on a networking service provider. As shown in FIG. 3B, Patrick has received a number of different feeds related to a contact "Joe". One feed 352 indicates a URL visited by Joe, another feed indicates a music selection 354 listened to by Joe, and a third feed indicates as a place or location 356 visited by Joe. Joe has also shared his current location 3588. For each of these entries or feeds, 352, 354, 356 and 358, a time stamp can be associated therewith. Entries 352 and 354 have the same time stamp, "12:26 pm", meaning that both were open and active at the time the sharing module 136 was activated to capture the content for sharing.

Figure 3C:
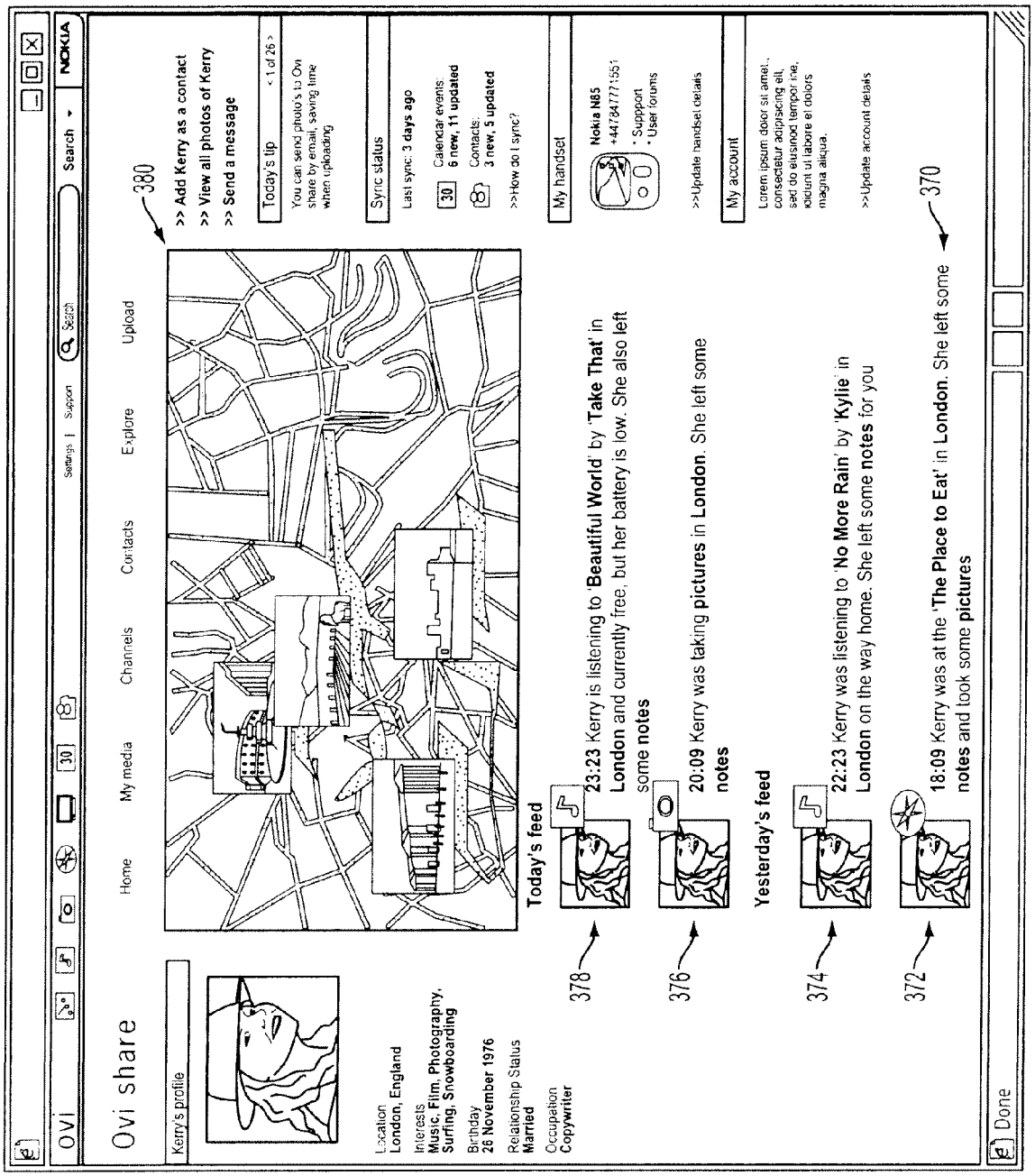

FIG. 3C illustrates another example of the application of the aspects of the disclosed embodiments. FIG. 3C is a screen shot 370 of a user profile on a sharing website, such as Share on Ovi™. In this example, the user's shared content at various points in time is displayed. As shown in FIG. 3C, feeds 372, 374 are from the day before, designated as "Yesterday's feeds". Feeds 376, 378 are from the current day, designated as "Today's feed". Each feed includes a date stamp and a description of the content and content type. In this example, map 380 is also provided that indicates the user's location corresponding to each of the respective feeds. Each time the user activated the sharing module 136, each of the feeds shown in FIG. 3C was generated.

Figure 4:
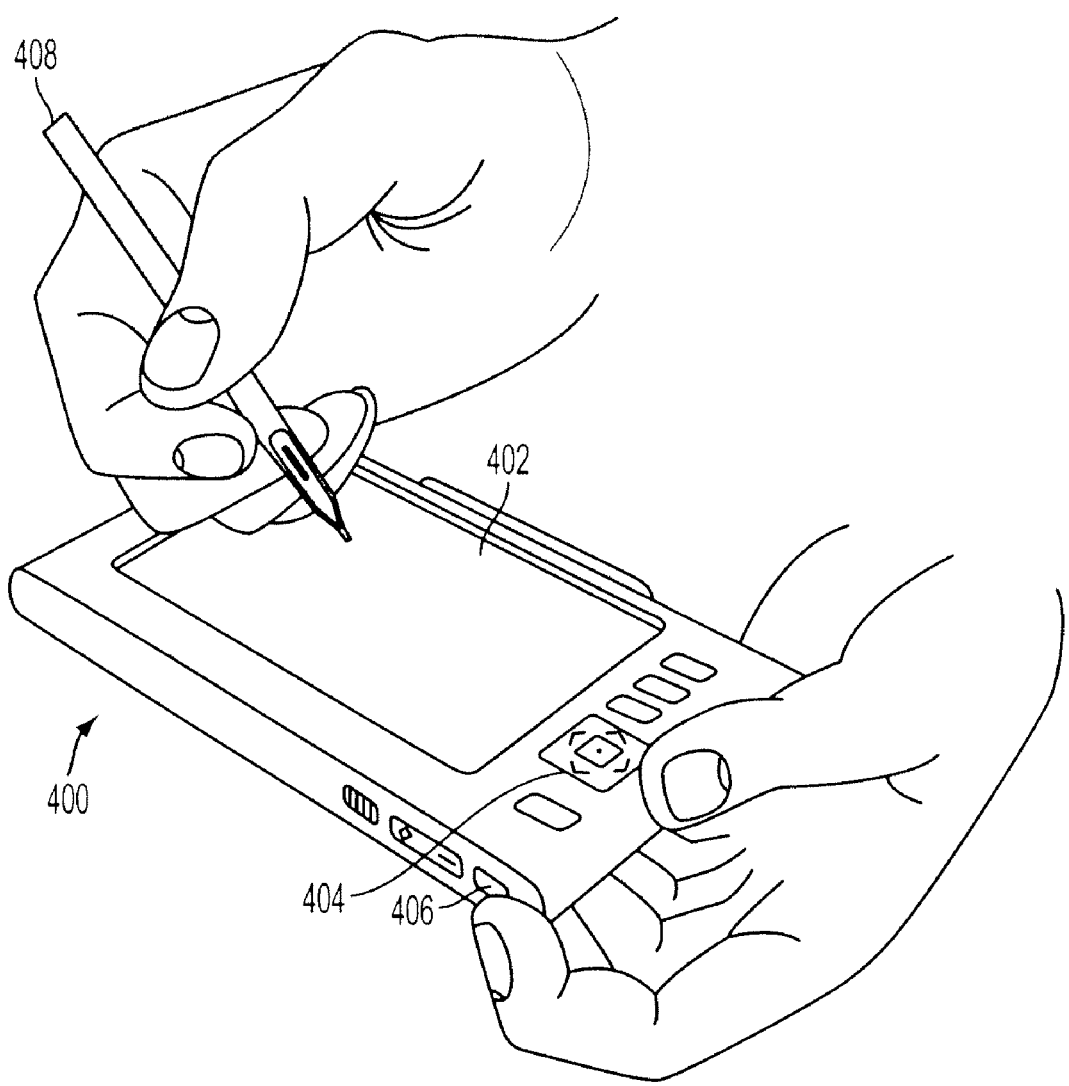
FIG. 4 illustrates one example of a device that can be used to practice aspects of the disclosed embodiments.

FIG. 4 illustrates one example of a device 400 that can be used to practice aspects of the disclosed embodiments. In one embodiment, the device 400 includes a touch screen display device. As shown in FIG. 4, the device 400 includes a display 402, a set of control keys 404 and a sharing activation key 406. In one embodiment the control keys 404 comprise a joystick style control. The sharing activation key 406 can comprise a push button or key style control activator. In alternate embodiments the device 400 can include other suitable input and output devices, such as touch screen pointer 408 for a touch screen display, that might be found on a mobile communication or Internet enabled device. The location and positioning of the share key 406 in FIG. 4 is merely exemplary, and in alternate embodiments, the share key 406 can be in any suitable location on the device 400. In one embodiment, the center button of the control keys 404 can be enabled as the share key 406 when there is content available to be shared.

Figure 5A:
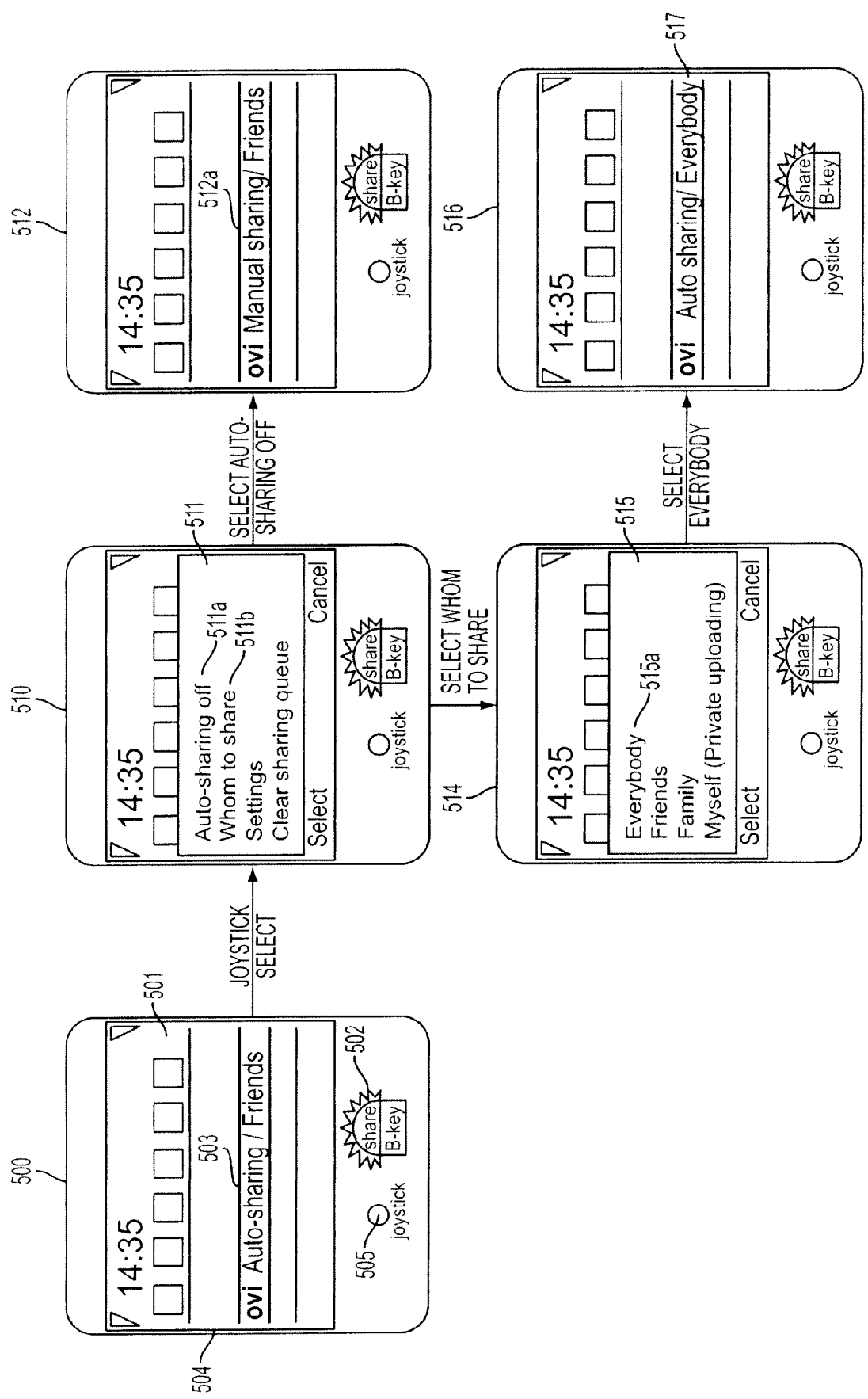

FIG. 5A illustrates a series of states an exemplary user interface incorporating aspects of the disclosed embodiments. State 500 is illustrative of a user interface on a device such as that shown in FIG. 4, where an auto-sharing module incorporating aspects of the disclosed embodiments is installed and active in the device. The auto-sharing function can be enabled by activation of the share key 502. In one embodiment, when the auto-sharing function is activated or on, the key 502 can be illuminated or blinking slowly. An icon or other suitable visual identifier can be presented on the display 501 to inform the user that the auto-sharing function is enabled or active. In one embodiment a reference 503 can be included in that identifies the particular networking service that is active, that the sharing function is in an auto mode, as well as identify the targets or target group with whom content will be shared upon activation of the shared function. In alternate embodiments, any suitable indication or indicator can be user to identify such information to the user. Using the joystick 505 or other selection control, the user can access a control menu shown in state 510 that will allow the user to access a menu 511 that includes functions, controls and settings related to the auto-sharing capability. As shown in state 510, in this embodiment the user can turning the auto-sharing function off, designating whom to share with, access a settings menu, or clearing a sharing queue. In alternate embodiments, any suitable menu functions can be provided to enable a user to access, control and customize the auto-sharing function.

State 512 illustrates an example of the user interface when the auto-sharing off 511a menu item is selected. Selecting the auto-sharing off menu item 511a allows the user to control whether the sharing function is automatic or a manual operation 512a.

State 514 illustrates the situation where the user has selected the whom to share menu function 511b. This control menu allows the user to designate the intended target or targets for the sharing of content as described herein. State 514 presents a list 515 of contacts or other targets with whom content can be shared. And one embodiment, the list 515 can be dependent upon the particular networking or social group service that is active on the device. The groups displayed in the menu 515 can be created from within this menu setting or another application or menu setting. If the user selects the group "Everybody" 515a, the auto-sharing function will be configured to share content with those contacts designated for that group. The term "Everybody" generally refers to all users with whom content can be shared, such as for example users on the Internet or public domains. The selection of "Everybody 515a" can be shown in the state 516 together with the service icon and auto-sharing function identifier. In alternate embodiments, any suitable method of identifying the current sharing target(s) to the user can be used.

Figure 5B:
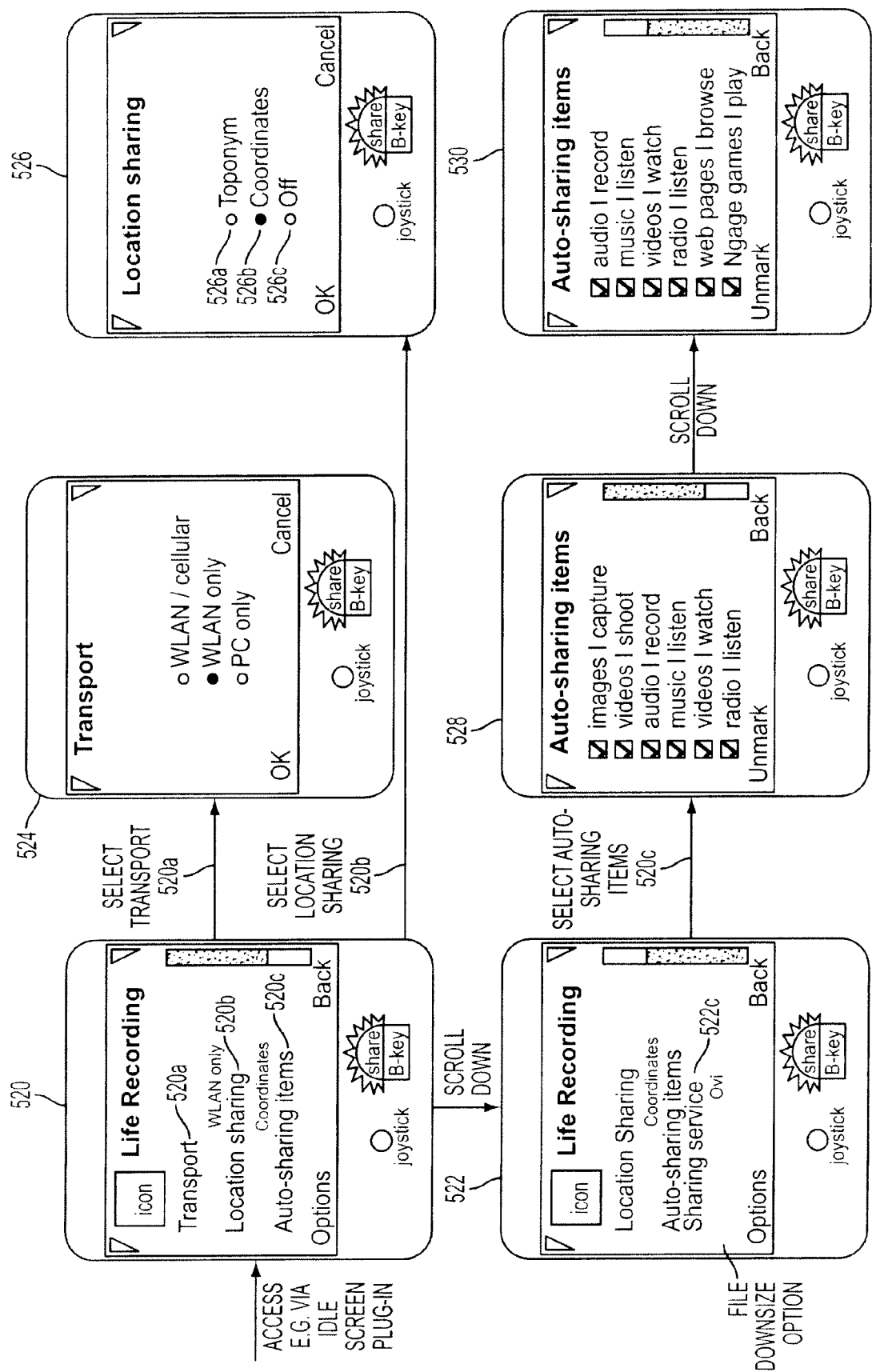

FIG. 5B illustrates some examples of the settings that can be controlled in accordance with the aspects of the disclosed in bindings. State 520 is one example of a settings menu for an auto-sharing device of the disclosed embodiments. In this example, controls are provided for settings that include transport 520a, location sharing 520b and auto-sharing items 520c. In alternate embodiments, controls can be provided for any suitable settings in conjunction with an auto-sharing function. For example, if a user scrolls down the menu shown in state 520, additional setting control selections can be presented, such as for example the sharing service 522a.

Selection of the transport menu item 520a will allow the user to select and/or activate a particular communication transport mode as shown in the state 524. Selection of the location sharing menu item 520b will provide the user with the ability to control and/or set information that might be shared concerning the user's location. As shown in state 526, the user can enable the device to provide location information that includes the name of a place 526a or geographic coordinates 526b. The user can also turn the location sharing off 526c. In alternate embodiments any suitable method can be used to identify location information.

State 528 includes a list of content that can be enabled to be shared automatically. Selection of the auto-sharing items 520c will allow the user to access the list shown in states 528 and 530 and selectively determine what content may or may not be shared automatically. By checking or unchecking the boxes shown in states 528 and 530, content can be identified or designated (marked) to be shared automatically. The list of content is not limited by the content items shown in states 528 and 530 and can include any suitable content. In one embodiment, the type and amount of content that can be shared can be limited by the particular service provider. Certain types of content can also be designated to always be shared, such as for example, the date/time, availability/status, and/or text/tags. This can be advantageous to provide uniformity in the format of content that is automatically shared.

FIG. 5C illustrates an example of auto-sharing a video image. State 540 illustrates the post-capture view of the device 400 of FIG. 4 after the recording is completed. In this example, the user has activated the share key 542 to stop the recording. In one embodiment, the user can use the keys 541 to edit, delete or manually upload the video recording. In this situation, auto-sharing of the video will not occur. Rather, the user may be presented with a viewfinder or other suitable imaging application as shown in state 546.

In one embodiment, from the post-capture view 540, if the sharing function is active the pressing of a key other than an editing key 541 can initiate auto-sharing to take place. In this example the user has stopped the recording by activating the share-key 542. In one embodiment the key 542 can be highlighted in some fashion to indicate that the auto-sharing function is active. Since auto-sharing is active, pressing or activating the "Back" key 543 will cause auto-sharing to take place as well as take the user back to the previous state 548, which in this example comprises the viewfinder application. In one embodiment, the share key 542 can be highlighted in some fashion to indicate that auto-sharing is taking place. This can include, for example, a visual or audible indication. In one embodiment, the visual indicator may be a constant or rapidly blinking light, LED, image or icon, or a color combination. An audible indicator such as a beep, tone or other sound may be used in conjunction with or in substitution for the visual indicator. In alternate embodiments, any suitable method for presenting the user with an indication that auto-sharing is taking place can be used.

In one embodiment, pressing an END or other similar stop operation key after activating the share key 542 will cause auto-sharing to execute as is described herein. The END key can comprise any suitable key or input device that is configured to stop or exit an operation. If the camera application is exited and the user is returned to an idle control screen, such as that shown in state 550, an indicator 552 can be provided to advise the user that auto-sharing is taking place. In the example shown in FIG. 5C, a textual indicator "UPL" 552 is shown. In alternate embodiments, any suitable indicator can be used, such as for example an icon or image. The idle control state 550 also identifies the networking service 553 that is active, the auto-sharing function and target settings 554.

Figure 5D:
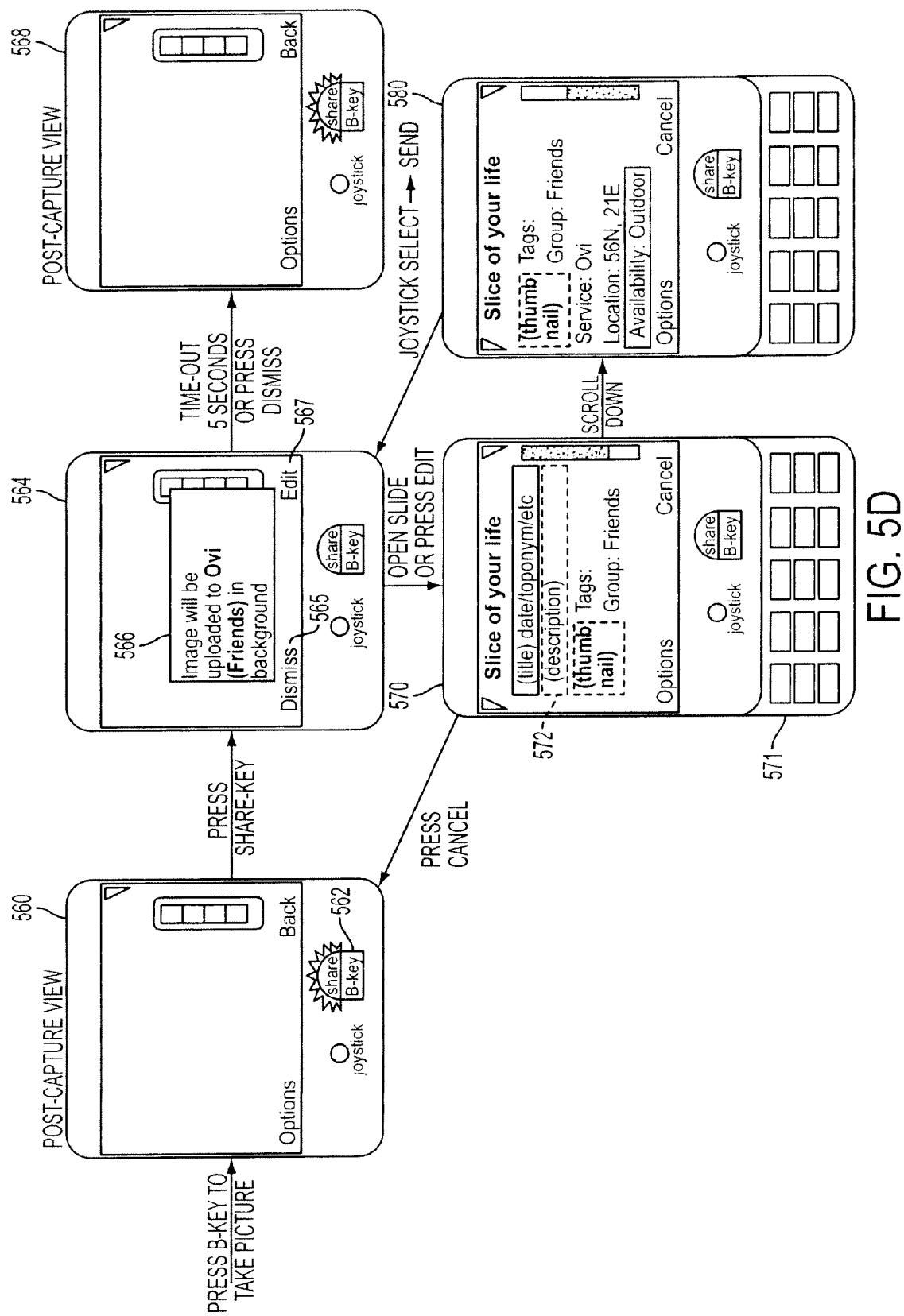

FIG. 5D illustrates an example of manual bookmarking and sharing in accordance with the aspects of the disclosed embodiments. As shown in state 560, a post-capture view of an image application is shown. In this example, the share key 562 is activated to take the picture. However, the auto-sharing setting 511*a* of FIG. 5A is set to "Manual sharing." In this example, the device can prompt the user to share the content in a suitable fashion, such as by a text, audio or other visual prompt. In the exemplary user interface 560, the share key is configured to blink to invite the user to share the picture that was taken. If the user activates the share key 562, the image will be uploaded to the active networking service and the designated recipients. In this example, the "whom to share" setting 511*b* is set to "friends" as shown in the state 512 of FIG. 5A. In one embodiment the user can be informed that the image will be uploaded. If the user takes no further action or presses the "dismiss" function key the user is returned to the post-capture view as shown in the state 568. In one embodiment, if the user activates an edit function 567 or a keyboard function 571, the user can be presented with options to edit the tags/details accompanying the image being uploaded. Examples of a shared details view are shown in states 570 and 580. In these examples, the content to be shared, such as a photo in this example, can be annotated with posts 572. The posts can include for example, text and tags that are associated with context elements, such as metadata.

Referring again to FIG. 1, the system 100 of the disclosed embodiments can generally include input device(s) 104, output device(s) 106, process module 122, applications module 180, and storage/memory device(s) 182. The components described herein are merely exemplary and are not intended to encompass all components that can be included in the system 100. The system 100 can also include one or more processors or computer program products to execute the processes, methods, sequences, algorithms and instructions described herein.

The input device(s) 104 are generally configured to allow a user to input data, instructions and commands to the system 100. In one embodiment, the input device 104 can be configured to receive input commands remotely or from another device that is not local to the system 100. The input device 104 can include devices such as, for example, keys 110, touch screen 112, menu 124, a camera device 125 or such other image capturing system. In alternate embodiments the input device can comprise any suitable device(s) or means that allows or provides for the input and capture of data, information and/or instructions to a device, as described herein. The output device(s) 106 are configured to allow information and data to be presented to the user via the user interface 102 of the system 100 and can include one or more devices such as, for example, a display 114, audio device 115 or tactile output device 116. In one embodiment, the output device 106 can be configured to transmit output information to another device, which can be remote from the system 100. While the input device 104 and output device 106 are shown as separate devices, in one embodiment, the input device 104 and output device 106 can be combined into a single device, and be part of and form, the user interface 102. The user interface 102 can be used to receive and display information pertaining to content, objects and targets, as will be described below. While certain devices are shown in FIG. 1, the scope of the disclosed embodiments is not limited by any one or more of these devices, and an exemplary embodiment can include, or exclude, one or more devices. For example, in one exemplary embodiment, the system 100 may not include a display or only provide a limited display, and the input devices, or application opening or activation function, may be limited to the key 108*a* of the headset device.

The process module 122 is generally configured to execute the processes and methods of the disclosed embodiments. The application process controller 132 can be configured to interface with the applications module 180, for example, and execute applications processes with respects to the other modules of the system 100. In one embodiment the applications module 180 is configured to interface with applications that are stored either locally to or remote from the system 100 and/or web-based applications. The applications module 180 can include any one of a variety of applications that may be installed, configured or accessible by the system 100, such as for example, office, business, media players and multimedia applications, web browsers and maps. In alternate embodiments, the applications module 180 can include any suitable application. The communication module 134 shown in FIG. 1 is generally configured to allow the device to receive and send communications and messages, such as text messages, chat messages, multimedia messages, video and email, for example. The communications module 134 is also configured to receive information, data and communications from other devices and systems.

In one embodiment, the system 100 can also include a voice recognition system 142 that includes a text-to-speech module that allows the user to receive and input voice commands, prompts and instructions.

Referring to FIG. 1, in one embodiment, the user interface of the disclosed embodiments can be implemented on or in a device that includes a touch screen display, proximity screen device or other graphical user interface. Although a display associated with the system 100, it will be understood that a display is not essential to the user interface of the disclosed embodiments. In an exemplary embodiment, the display is limited or not available. In alternate embodiments, the aspects of the user interface disclosed herein could be embodied on any suitable device that will allow the selection and activation of applications or system content when a display is not present.

In one embodiment, the display 114 can be integral to the system 100. In alternate embodiments the display may be a peripheral display connected or coupled to the system 100. A pointing device, such as for example, a stylus, pen or simply the user's finger may be used with the display 114. In alternate embodiments any suitable pointing device may be used. In other alternate embodiments, the display may be any suitable display, such as for example a flat display 114 that is typically made of a liquid crystal display (LCD) with optional back lighting, such as a thin film transistor (TFT) matrix capable of displaying color images.

The terms "select" and "touch" are generally described herein with respect to a touch screen-display. However, in alternate embodiments, the terms are intended to encompass the required user action with respect to other input devices. For example, with respect to a proximity screen device, it is not necessary for the user to make direct contact in order to select an object or other information. Thus, the above noted terms are intended to include that a user only needs to be within the proximity of the device to carry out the desired function.

Similarly, the scope of the intended devices is not limited to single touch or contact devices. Multi-touch devices, where contact by one or more fingers or other pointing devices can navigate on and about the screen, are also intended to be encompassed by the disclosed embodiments. Non-touch devices are also intended to be encompassed by the disclosed embodiments. Non-touch devices include, but are not limited to, devices without touch or proximity screens, where navigation on the display and menus of the various applications is performed through, for example, keys 110 of the system or through voice commands via voice recognition features of the system.

Figure 6A:
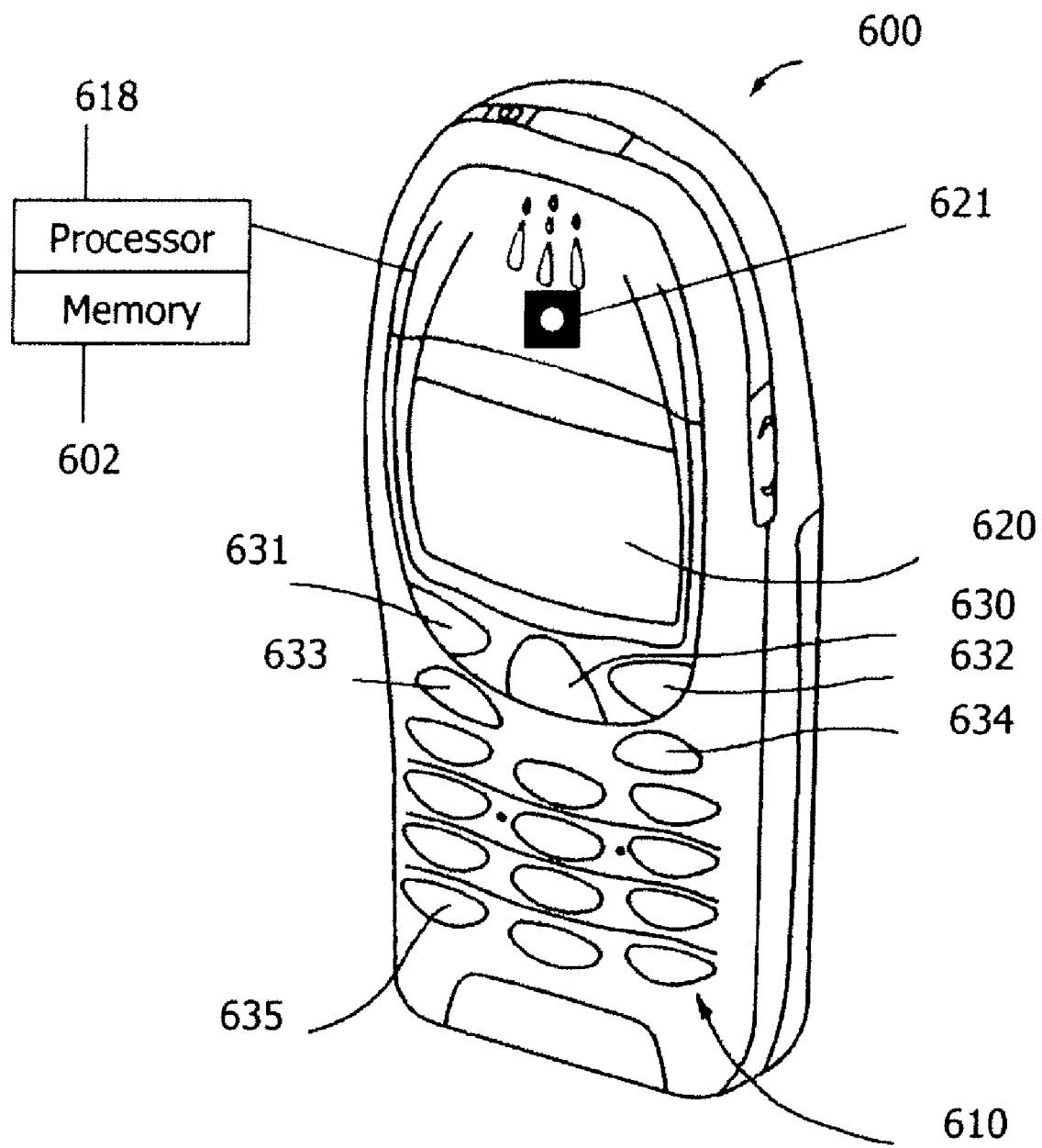
FIGS. 6A-6B are illustrations of exemplary devices that can be used to practice aspects of the disclosed embodiments.
Figure 6B:
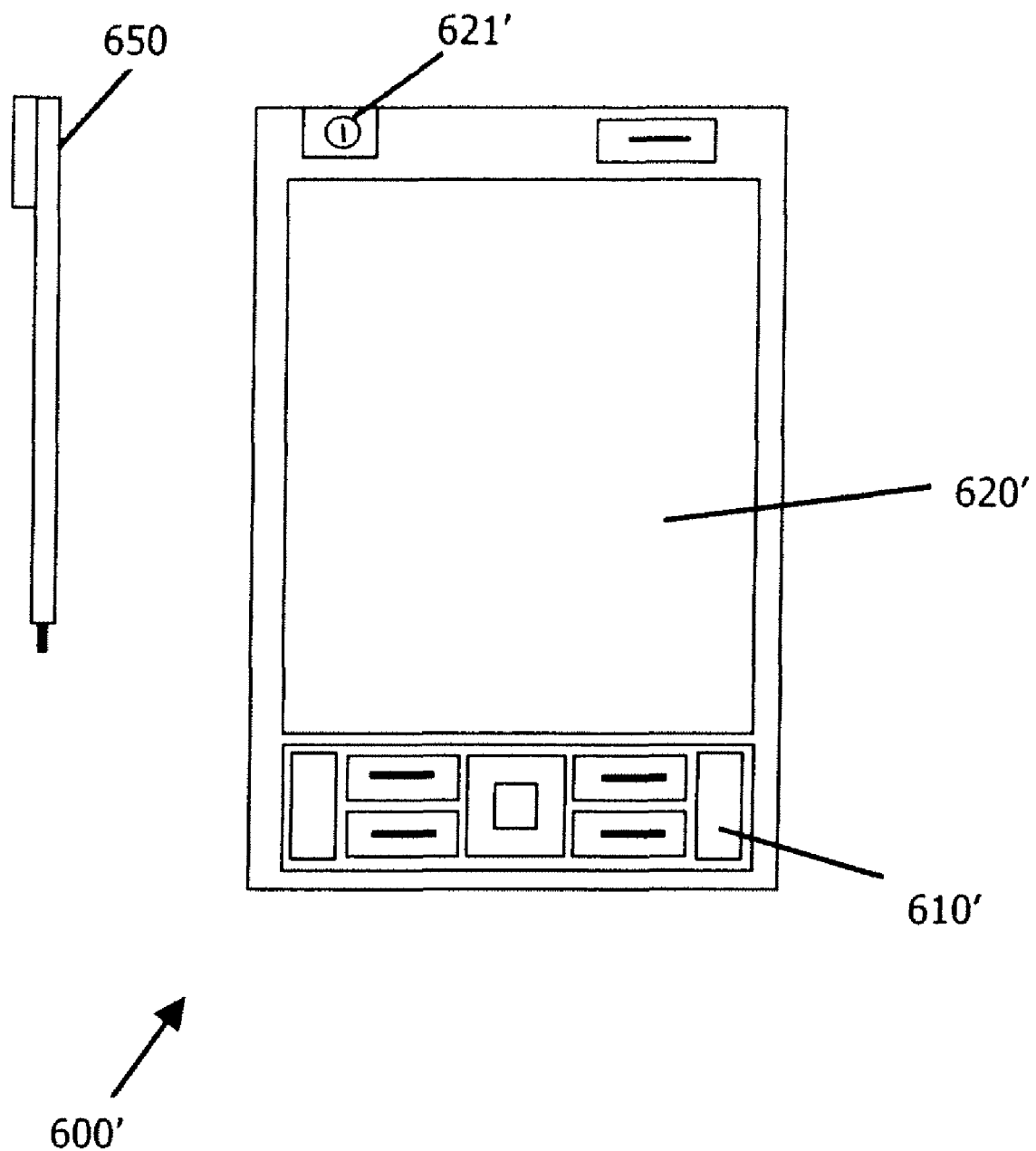

Some examples of devices on which aspects of the disclosed embodiments can be practiced are illustrated with respect to FIGS. 6A-6B. The devices are merely exemplary and are not intended to encompass all possible devices or all aspects of devices on which the disclosed embodiments can be practiced. The aspects of the disclosed embodiments can rely on very basic capabilities of devices and their user interface. Buttons or key inputs can be used for selecting the various selection criteria and links, and a scroll function can be used to move to and select item(s).

As shown in FIG. 6A, in one embodiment, the terminal or mobile communications device 600 may have a keypad 610 as an input device and a display 620 for an output device. The keypad 610 may include any suitable user input devices such as, for example, a multi-function/scroll key 630, soft keys 631, 632, a call key 633, an end call key 634 and alphanumeric keys 635. Any one of these keys can be designated as the share key, where activation of the key will enable the share function described herein. In one embodiment, the device 600 includes an image capture device such as a camera 621, as a further input device. The display 620 may be any suitable display, such as for example, a touch screen display or graphical user interface. The display may be integral to the device 600 or the display may be a peripheral display connected or coupled to the device 600. A pointing device, such as for example, a stylus, pen or simply the user's finger may be used in conjunction with the display 620 for cursor movement, menu selection and other input and commands. In alternate embodiments, any suitable pointing or touch device may be used. In other alternate embodiments, the display may be a conventional display. The device 600 may also include other suitable features such as, for example a loud speaker, tactile feedback devices or connectivity port. The mobile communications device may have a processor 618 connected to the display for processing user inputs and displaying information and links on the display 620, as well as carrying out the method steps described herein. A memory 602 may be connected to the processor 618 for storing any suitable information, data, settings and/or applications associated with the mobile communications device 600.

Figure 7:
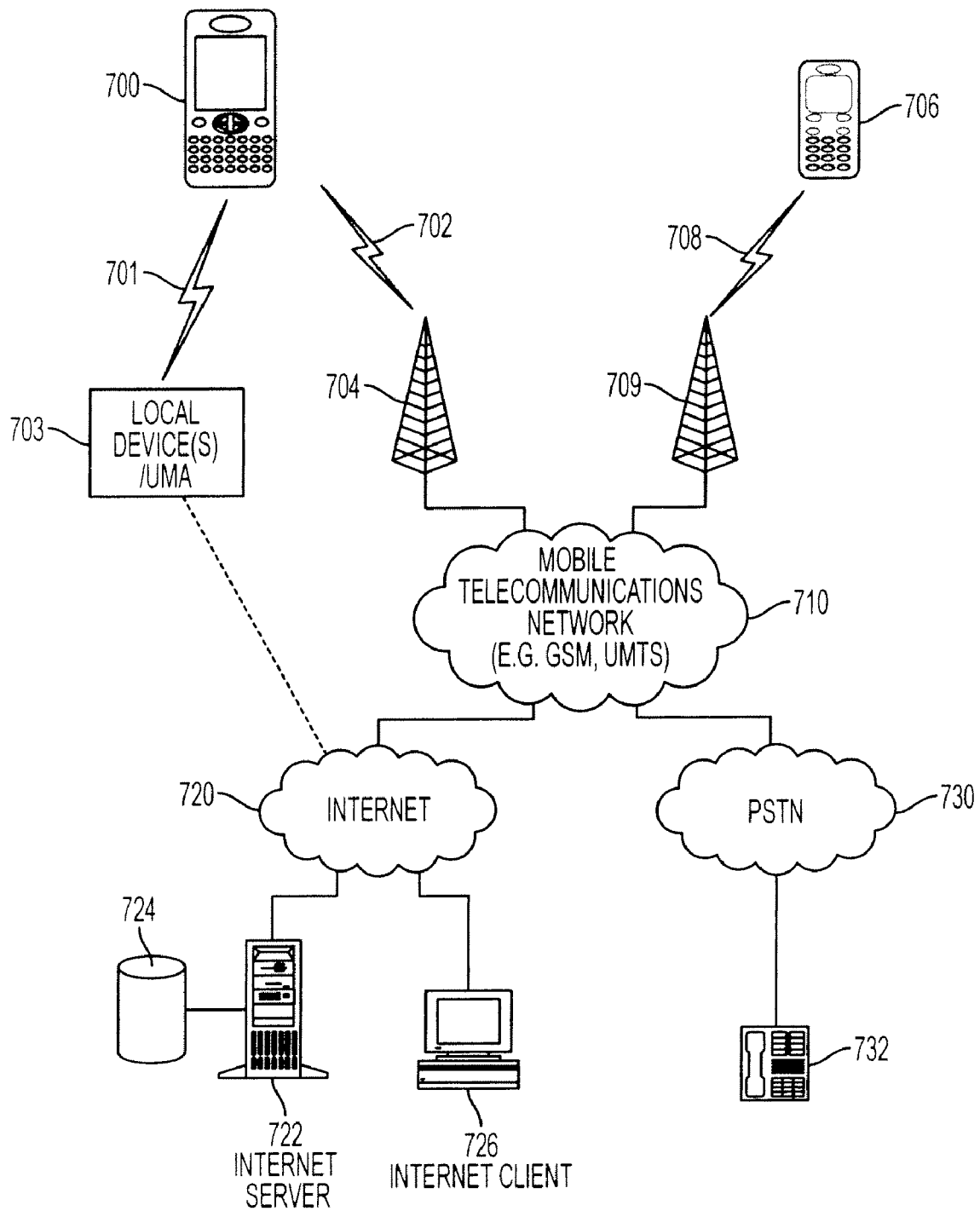
FIG. 7 illustrates a block diagram of an exemplary system incorporating features that may be used to practice aspects of the disclosed embodiments.

In the embodiment where the device 600 comprises a mobile communications device, the device can be adapted for communication in a telecommunication system, such as that shown in FIG. 7. In such a system, various telecommunications services such as cellular voice calls, worldwide web/wireless application protocol (www/wap) browsing, cellular video calls, data calls, facsimile transmissions, data transmissions, music transmissions, multimedia transmissions, still image transmission, video transmissions, electronic message transmissions and electronic commerce may be performed between the mobile terminal 700 and other devices, such as another mobile terminal 706, a line telephone 732, a personal computer 751 and/or an internet server 722.

In one embodiment the system is configured to enable any one or combination of chat messaging, instant messaging, text messaging and/or electronic mail. It is to be noted that for different embodiments of the mobile terminal 700 and in different situations, some of the telecommunications services indicated above may or may not be available. The aspects of the disclosed embodiments are not limited to any particular set of services or communication system or protocol in this respect.

The mobile terminals 700, 706 may be connected to a mobile telecommunications network 710 through radio frequency (RF) links 702, 708 via base stations 704, 709. The mobile telecommunications network 710 may be in compliance with any commercially available mobile telecommunications standard such as for example the global system for mobile communications (GSM), universal mobile telecommunication system (UMTS), digital advanced mobile phone service (D-AMPS), code division multiple access 2000 (CDMA2000), wideband code division multiple access (WCDMA), wireless local area network (WLAN), freedom of mobile multimedia access (FOMA) and time division-synchronous code division multiple access (TD-SCDMA).

The mobile telecommunications network 710 may be operatively connected to a wide-area network 720, which may be the Internet or a part thereof. An Internet server 722 has data storage 724 and is connected to the wide area network 720, as is an Internet client 726. The server 722 may host a worldwide web/wireless application protocol server capable of serving worldwide web/wireless application protocol content to the mobile terminal 700. Mobile terminal 700 can also be coupled via link 742 to the Internet 720'. In one embodiment, link 742 can comprise a wired or wireless link, such as a Universal Serial Bus (USB) or Bluetooth connection for example.

A public switched telephone network (PSTN) 730 may be connected to the mobile telecommunications network 710 in a familiar manner. Various telephone terminals, including the stationary telephone 732, may be connected to the public switched telephone network 730.

The mobile terminal 700 is also capable of communicating locally via a local link 701 to one or more local devices 703. The local links 701 may be any suitable type of link or piconet with a limited range, such as for example Bluetooth™, a Universal Serial Bus (USB) link, a wireless Universal Serial Bus (WUSB) link, an IEEE 802.11 wireless local area network (WLAN) link, an RS-232 serial link, etc. The local devices 703 can, for example, be various sensors that can communicate measurement values or other signals to the mobile terminal 700 over the local link 701. The above examples are not intended to be limiting, and any suitable type of link or short range communication protocol may be utilized. The local devices 703 may be antennas and supporting equipment forming a wireless local area network implementing Worldwide Interoperability for Microwave Access (WiMAX, IEEE 802.16), WiFi (IEEE 802.11x) or other communication protocols. The wireless local area network may be connected to the Internet. The mobile terminal 700 may thus have multi-radio capability for connecting wirelessly using mobile communications network 710, wireless local area network or both. Communication with the mobile telecommunications network 710 may also be implemented using WiFi, Worldwide Interoperability for Microwave Access, or any other suitable protocols, and such communication may utilize unlicensed portions of the radio spectrum (e.g. unlicensed mobile access (UMA)). In one embodiment, the navigation module 122 of FIG. 1 includes communications module 134 that is configured to interact with, and communicate to/from, the system described with respect to FIG. 7.

Although the above embodiments are described as being implemented on and with a mobile communication device, it will be understood that the disclosed embodiments can be practiced on any suitable device incorporating a processor, memory and supporting software or hardware. For example, the disclosed embodiments can be implemented on various types of music, gaming and multimedia devices. In one embodiment, the system 100 of FIG. 1 may be for example, a personal digital assistant (PDA) style device 600' illustrated in FIG. 6B. The personal digital assistant 600' may have a keypad 610', a touch screen display 620', camera 621' and a pointing device 650 for use on the touch screen display 620'. In still other alternate embodiments, the device may be a personal computer, a tablet computer, touch pad device, Internet tablet, a laptop or desktop computer, a mobile terminal, a cellular/mobile phone, a multimedia device, a personal communicator, a television or television set top box, a digital video/versatile disk (DVD) or High Definition player or any other suitable device capable of containing for example a display 114 shown in FIG. 1, and supported electronics such as the processor 618 and memory 602 of FIG. 6A. In one embodiment, these devices will be Internet enabled and can include map and GPS capability.

The user interface 102 of FIG. 1 can also include menu systems 124 coupled to the processing module 122 for allowing user input and commands. The processing module 122 provides for the control of certain processes of the system 100 including, but not limited to the controls for selecting files and objects, establishing and selecting search and relationship criteria and navigating among the search results. The menu system 124 can provide for the selection of different tools and application options related to the applications or programs running on the system 100 in accordance with the disclosed embodiments. In the embodiments disclosed herein, the process module 122 receives certain inputs, such as for example, signals, transmissions, instructions or commands related to the functions of the system 100, such as messages, notifications and state change requests. Depending on the inputs, the process module 122 interprets the commands and directs the process control 132 to execute the commands accordingly in conjunction with the other modules, such as application control module 136, application indication module 137, application ordering module 138 and text-to-speech module 142.

Figure 8:
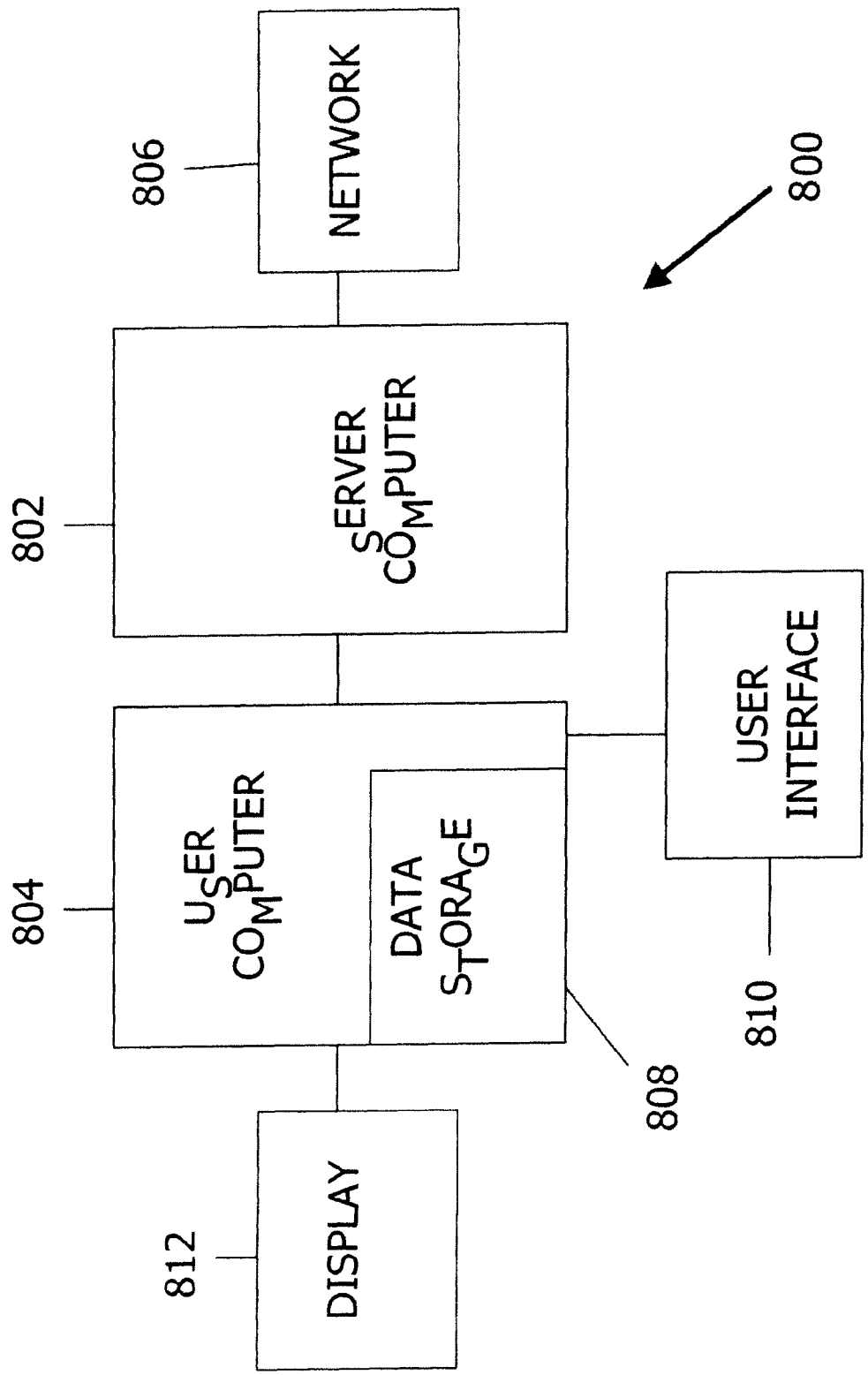
FIG. 8 is a block diagram illustrating the general architecture of an exemplary system in which the devices of FIGS. 6A and 6B may be used.

The disclosed embodiments may also include software and computer programs incorporating the process steps and instructions described above. In one embodiment, the programs incorporating the process steps described herein can be executed in one or more computers. FIG. 8 is a block diagram of one embodiment of a typical apparatus 800 incorporating features that may be used to practice aspects of the invention. The apparatus 800 can include computer readable program code means for carrying out and executing the process steps described herein. In one embodiment the computer readable program code is stored in a memory of the device. In alternate embodiments the computer readable program code can be stored in memory or memory medium that is external to, or remote from, the apparatus 800. The memory can be direct coupled or wireless coupled to the apparatus 800. As shown, a computer system 802 may be linked to another computer system 804, such that the computers 802 and 804 are capable of sending information to each other and receiving information from each other. In one embodiment, computer system 802 could include a server computer adapted to communicate with a network 806. Alternatively, where only one computer system is used, such as computer 804, computer 804 will be configured to communicate with and interact with the network 806. Computer systems 802 and 804 can be linked together in any conventional manner including, for example, a modem, wireless, hard wire connection, or fiber optic link. Generally, information can be made available to both computer systems 802 and 804 using a communication protocol typically sent over a communication channel or other suitable connection or line, communication channel or link. In one embodiment, the communication channel comprises a suitable broad-band communication channel. Computers 802 and 804 are generally adapted to utilize program storage devices embodying machine-readable program source code, which is adapted to cause the computers 802 and 804 to perform the method steps and processes disclosed herein. The program storage devices incorporating aspects of the disclosed embodiments may be devised, made and used as a component of a machine utilizing optics, magnetic properties and/or electronics to perform the procedures and methods disclosed herein. In alternate embodiments, the program storage devices may include magnetic media, such as a diskette, disk, memory stick or computer hard drive, which is readable and executable by a computer. In other alternate embodiments, the program storage devices could include optical disks, read-only-memory ("ROM") floppy disks and semiconductor materials and chips.

Computer systems 802 and 804 may also include a microprocessor for executing stored programs. Computer 802 may include a data storage device 808 on its program storage device for the storage of information and data. The computer program or software incorporating the processes and method steps incorporating aspects of the disclosed embodiments may be stored in one or more computers 802 and 804 on an otherwise conventional program storage device. In one embodiment, computers 802 and 804 may include a user interface 810, and/or a display interface 812 from which aspects of the invention can be accessed. The user interface 810 and the display interface 812, which in one embodiment can comprise a single interface, can be adapted to allow the input of queries and commands to the system, as well as present the results of the commands and queries, as described with reference to FIG. 1, for example.

The aspects of the disclosed embodiments allow a user to share content, information and status with others quickly, easily and immediately. With the activation of a single control, such as a key, a user can capture for example, a video or image just taken, a current location on a map, a song title currently being listened to, and/or a URL of a web page being currently looked at, and share this content with others in real-time.

It is noted that the embodiments described herein can be used individually or in any combination thereof. It should be understood that the foregoing description is only illustrative of the embodiments. Various alternatives and modifications can be devised by those skilled in the art without departing from the embodiments. Accordingly, the present embodiments are intended to embrace all such alternatives, modifications and variances that fall within the scope of the appended claims.

What is claimed is:

1. A method comprising:
capturing content active in a device;
identifying types of content captured;
associating the types of content with respective ones of at least one target device, to which the captured content is to be uploaded, depending on the types of content; and
automatically uploading the content to the at least one target device if a content sharing module in the device is active.

2. The method of claim 1 further comprising, if the content sharing module is not active, capturing the content using a bookmark key and activating the sharing facility to upload the content to the at least one target device.

3. The method of claim 1 further comprising marking the captured content as content to be shared, wherein only content marked as content to be shared is automatically uploaded.

4. The method of claim 3 wherein content captured using a bookmark key is automatically marked as content to be shared.

5. The method of claim 1 wherein an occurrence of an event detected by the device triggers a capturing of content related to the event and automatic upload of the content to the at least one target device when the content sharing module is active.

6. The method of claim 1 wherein the event is a music track change, an image capture, a video capture, accessing a web site, a calendar event, a contact update, a time/date event or a location change.

7. The method of claim 1 wherein capturing content active on the device further comprises:
identifying all applications open on the device; and
temporarily storing any active content of the open applications in a transfer location.

8. The method of claim 1 further comprising activating the content sharing module prior to capturing the content using an input key of the device.

9. The method of claim 1 wherein the content is taken from an imaging application, a video application, a location application, an internet site, a music application, an calendar application or a time/date application.

10. The method of claim 1 further comprising:
acquiring content in the device from a content application;
activating a share content function of the device; and
making the acquired content available to be captured for sharing as the active content.

11. The method of claim 10, further comprising, after activating the share content function, selecting at least one target recipient to receive the acquired content.

12. The method of claim 10 further comprising activating the share content function to acquire the content from the content application.

13. A computer program product stored in a memory comprising computer readable program code means configured to execute the method according to claim 1.

14. An apparatus comprising:
at least one processor and a memory storing instructions, the at least one processor, upon execution of the instructions, being configured to capture content active in a device;
at least one processor configured to identify types of content captured;
at least one processor configured to associate the types of content with respective ones of at least one target device, to which the captured content is to be uploaded, depending on the types of content; and
at least one processor configured to automatically upload the content to the at least one target device if a content sharing module in the device is active.

15. The apparatus of claim 14 wherein the at least one processor is further configured, if the content sharing module is not active, to capture the content using a bookmark key and activate the content sharing module to upload the content to the at least one target device.

16. The apparatus of claim 14 wherein the at least one processor is further configured to mark the captured content as content to be shared, wherein only content marked as content to be shared is automatically uploaded.

17. The apparatus of claim 14 wherein the at least one processor is further configured to activate the content sharing module prior to capturing the content using an input key of the device.

18. The apparatus of claim 14 wherein the device is a mobile communication device.

19. A device having a user interface comprising:
at least one processor and a memory storing instructions, the at least one processor, upon execution of the instructions, being configured to capture content active in the device;
at least one processor configured to identify types of content captured;
at least one processor configured to associate the types of content with respective ones of at least one target device, to which the captured content is to be uploaded, depending on the types of content; and
at least one processor configured to automatically upload the content to the at least one target device if a content sharing module in the device is active.

20. The user interface of claim 19 wherein the at least one processor is further configured, if the content sharing module is not active, to capture the content using a bookmark key and activate the content sharing module to upload the content to the at least one target device.

* * * * *